US009137094B1

(12) United States Patent
Sayed et al.

(10) Patent No.: US 9,137,094 B1
(45) Date of Patent: Sep. 15, 2015

(54) METHOD FOR SETTING DNS RECORDS

(71) Applicants: Imranali Sayed, Bangalore (IN); Rajatish Mukherjee, Sunnyvale, CA (US); Matthew Henry Drake, San Francisco, CA (US); Gopal Lal, Bangalore (IN); Nikhil Anthony Balaraman, San Francisco, CA (US)

(72) Inventors: Imranali Sayed, Bangalore (IN); Rajatish Mukherjee, Sunnyvale, CA (US); Matthew Henry Drake, San Francisco, CA (US); Gopal Lal, Bangalore (IN); Nikhil Anthony Balaraman, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 263 days.

(21) Appl. No.: 13/711,712

(22) Filed: Dec. 12, 2012

(51) Int. Cl.
G06F 15/16 (2006.01)
H04L 29/12 (2006.01)
G06F 21/31 (2013.01)

(52) U.S. Cl.
CPC .......... H04L 29/12066 (2013.01); G06F 21/31 (2013.01)

(58) Field of Classification Search
CPC .............. H04L 29/06; H04L 29/08576; H04L 29/0809; H04L 29/06537; G06Q 10/107
USPC ........................................................ 709/218
See application file for complete search history.

(56) References Cited

U.S. PATENT DOCUMENTS

| 7,882,204 | B2 | 2/2011 | McLoughlin |
| 7,925,786 | B2 | 4/2011 | Blinn |
| 7,987,251 | B2 | 7/2011 | Blinn et al. |
| 2002/0010798 | A1* | 1/2002 | Ben-Shaul et al. ........... 709/247 |
| 2003/0097564 | A1* | 5/2003 | Tewari et al. ................. 713/171 |
| 2005/0144323 | A1 | 6/2005 | Gardos et al. |
| 2006/0088026 | A1 | 4/2006 | Mazur et al. |
| 2006/0168164 | A1* | 7/2006 | Lemson et al. ............... 709/221 |
| 2007/0067395 | A1 | 3/2007 | Blinn et al. |
| 2007/0067457 | A1 | 3/2007 | Blinn |
| 2007/0073818 | A1 | 3/2007 | Gardner et al. |
| 2007/0143432 | A1* | 6/2007 | Klos et al. ..................... 709/206 |
| 2007/0204026 | A1 | 8/2007 | Berger |
| 2007/0233901 | A1 | 10/2007 | Kuan et al. |
| 2008/0256202 | A1 | 10/2008 | Williams et al. |
| 2009/0049198 | A1 | 2/2009 | Blinn et al. |
| 2009/0216867 | A1* | 8/2009 | Pusateri et al. ............... 709/222 |
| 2012/0059895 | A1 | 3/2012 | Gardner et al. |
| 2012/0102126 | A1 | 4/2012 | Murphy et al. |

OTHER PUBLICATIONS

Amazon Web Services Blog, Amazon Web Services, Products, Tools, and Developer Information, web page, Aug. 22, 2012, http://www.aws.typepad.com/aws/2012/05/domain-verification-for-the-amazon-simple-email-service.html.

* cited by examiner

*Primary Examiner* — Tauqir Hussain
(74) *Attorney, Agent, or Firm* — Young Basile Hanlon & MacFarlane P.C.

(57) ABSTRACT

A method includes receiving a request to associate a user-specified domain name with an application function, identifying a registrar system based on the user-specified domain name, and generating a domain record file including domain record information that, when processed by the registrar system, is operable to cause association of the user-specified domain name with the application function. The method also includes identifying a configuration URL based on the user-specified domain name. The configuration URL includes a configuration hostname associated with the registrar system and a configuration pathname that corresponds to a record-setting API that is operable to modify one or more domain name records that are associated with the user-specified domain name. The method also includes transmitting the domain record file to the registrar system using the configuration URL.

25 Claims, 10 Drawing Sheets

510
512
514
GET /api/dnsrecords/example.com?access_token=324d342sf — 516
Host: example.org
Content-Type: application/x-www-form-urlencoded

FIG. 5A 520
522
{
"status":"SUCCESS",
"list_of_rrsets":[
        { // RRSet with 3 MX records
        532 → "name" : "example.com", — 528
                "type" : "MX",
                "class" : "IN",
                "ttl" : 3600,
                "rdata_list" : [
        530 → "1 MAIL1.EXAMPLE.ORG.",
        530 → "5 MAIL2.EXAMPLE.ORG.",
        530 → "10 MAIL3.EXAMPLE.ORG."
                ]
524
        }, { // RRSet of 2 CNAME records
                "name" : "example.com", ← 532
                "type" : "CNAME", — 528
                "class" : "IN",
                "ttl" : 100,
                "rdata_list" : [
        530 → "192.0.43.10",
        530 → "192.0.43.11"
                ]
        }
] // End of list of RRSets
}

```
                                    610
   514
        POST /api/dnsrecords/example.com?access_token=324d342sf  ← 516
        Host: example.org
        Content-Type: application/json
   612→ { "list_of_rrsets_to_delete" :
             [
              { // RRSet of 3 MX records to delete
                "name" : "example.com", ← 620
                "type" : "MX", ← 622
                "class" : "IN",
                "ttl" : 3600,
                "rdata_list" :
                   [                                              }— 614
        624→    "1 MAIL1.EXAMPLE.ORG.",
        624→    "5 MAIL2.EXAMPLE.ORG.",
        624→    "10 MAIL3.EXAMPLE.ORG."
                   ]
              },
             ],// End of delete list 618→ "list_of_rrsets_to_add" :
             [
              { // RRSet with 5 MX records to add
                "name" : "example.com", ← 620
                "type" : "MX", ← 622
                "class" : "IN",
                "ttl" : 3600,
                "rdata_list" :
                   [                                              }— 618
        624→    "1 ASPMX.L.EXAMPLE.NET.",
        624→    "5 ALT1.ASPMX.L.EXAMPLE.NET.",
        624→    "5 ALT2.ASPMX.L.EXAMPLE.NET.",
        624→    "10 ASPMX2.EXAMPLE.NET.",
        624→    "10 ASPMX3.EXAMPLE.NET."
                   ]
              },
             ]// End of add list
        }
```

{ "status" : "SUCCESS" }

```
{
    "status" :    "FAIL",
    "error":      "The user does not have privileges to change the dns records"
}
```

FIG. 6C

METHOD FOR SETTING DNS RECORDS

BACKGROUND

The Domain Name System (DNS) is a hierarchical, distributed naming system that associates domain names with Internet Protocol (IP) addresses. The manner in which domain names function is dictated by DNS records that are associated with the domain name. The owner of a domain name can set DNS records to cause a domain name to function in a desired manner.

Some applications, including desktop applications, mobile applications, and browser-based applications, allow a domain name to be used with the application. As an example, a web-based email service can be used with email addresses that are associated with domain names that are owned an individual or organization that uses the service. As another example, a subdomain can be created and used by the owner of the domain name to access a web-based service that is provided by a third party. Typically, the owner of the domain name is required to set or change DNS records in order to use these types of features.

For many individuals and organizations, DNS record administration is a poorly understood process. This causes usability challenges for features that rely on or encourage DNS record changes in order to work correctly. One known solution is to provide instructions that explain the DNS record changes that need to be made. Such instructions typically task the individual or organization with copying and pasting or retyping DNS record settings from the application into a configuration tool that is provided by a domain name registrar or hosting service. If any errors are made, the service will not work, and the individual or organization may have difficulty detecting and understanding the errors. This can lead to frustration, and increased demands for technical support.

SUMMARY

The disclosure relates to setting DNS records.

One aspect of the disclosed embodiments is a method that includes receiving, at one or more computers, a request to associate a user-specified domain name with an application function. The method also includes identifying, at the one or more computers, a registrar system based on the user-specified domain name. The method also includes generating, at the one or more computers, a domain record file including domain record information that, when processed by the registrar system, is operable to cause association of the user-specified domain name with the application function. The method also includes identifying, at the one or more computers, a configuration URL based on the user-specified domain name. The configuration URL includes a configuration hostname associated with the registrar system and a configuration pathname that corresponds to a record-setting API that is operable to modify one or more domain name records that are associated with the user-specified domain name. The method also includes transmitting the domain record file from the one or more computers to the registrar system using the configuration URL.

Another aspect of the disclosed embodiments is a storage medium including program instructions executable by the one or more processors that, when executed, cause the one or more processors to perform operations. The operations include receiving, from a user system at one or more server computers, a request to associate a user-specified domain name with an application function. The operations also include identifying, at the one or more server computers, a registrar system based on the user-specified domain name. The operations also include generating, at the one or more server computers, a domain record file including domain record information that, when processed by the registrar system, is operable to cause association of the user-specified domain name with the application function. The operations also include identifying, at the one or more server computers, a configuration URL based on the user-specified domain name. The configuration URL includes a configuration hostname associated with the registrar system and a configuration pathname that corresponds to a record-setting API that is operable to modify one or more domain name records that are associated with the user-specified domain name. The operations also include transmitting the domain record file from the one or more server computers to the registrar system using the configuration URL.

Another aspect of the disclosed embodiments is an apparatus that includes one or more processors and one or more memory devices for storing program instructions that are used by the one or more processors. The program instructions, when executed by the one or more processors, cause the one or more processors to receive, from a user system at the one or more processors, a request to associate a user-specified domain name with an application function. The program instructions also cause the one or more processors to identify, at the one or more processors, a registrar system based on the user-specified domain name. The program instructions also cause the one or more processors to generate, at the one or more processors, a domain record file including domain record information that, when processed by the registrar system, is operable to cause association of the user-specified domain name with the application function. The program instructions also cause the one or more processors to identify, at the one or more processors, a configuration URL based on the user-specified domain name, the configuration URL including a configuration hostname associated with the registrar system and a configuration pathname that corresponds to a record-setting API that is operable to modify one or more domain name records that are associated with the user-specified domain name. The program instructions also cause the one or more processors to transmit the domain record file from the one or more processors to the registrar system using the configuration URL.

BRIEF DESCRIPTION OF THE DRAWINGS

The description herein makes reference to the accompanying drawings wherein like reference numerals refer to like parts throughout the several views, and wherein:

FIGS. 5A-5B are examples of communications between a client computing device and an application provider system.

FIGS. 6A-6C are examples of communications between the client computing device and the application provider system.

DETAILED DESCRIPTION

The disclosure herein relates to setting DNS records. The systems and methods taught herein can be applied to allow an application function to be associated with a domain name that is owned by the user of the application. As used herein, the term "user" can refer to any or all of an individual, an organization, or a domain administrator that sets DNS records on behalf of an individual or organization. The application function can be any type of computer program or system. As one example, the application function can be an internet-based email client. In some of the examples discussed herein, the application function is implemented by the user's computer. In other examples that are discussed herein, the application function is implemented by one or more remote computers that are associated with an application provider service. Thus, the systems and methods discussed herein are applicable both to locally-installed software applications and cloud-based software-as-a-service platforms.

As taught herein, application functions can be associated with the user-specified domain name by identifying a registrar system that is associated with the domain name and generating a domain record file that includes domain record information. When processed by the registrar system, the domain record information will cause the registrar system to associate the user-specified domain name with the application function. Transmission of the domain record file is accomplished by identifying a configuration URL. In this system, the configuration URL may not be provided by the user, but rather can be determined based on the identity of the domain registrar and the user-specified domain name. This is accomplished by provision of a record-setting API at the registrar system that allows addition, deletion, and/or replacement of domain name records by way of URLs that follow a predetermined pattern that can be readily determined without the need for user knowledge of the URL itself.

Figure 1:
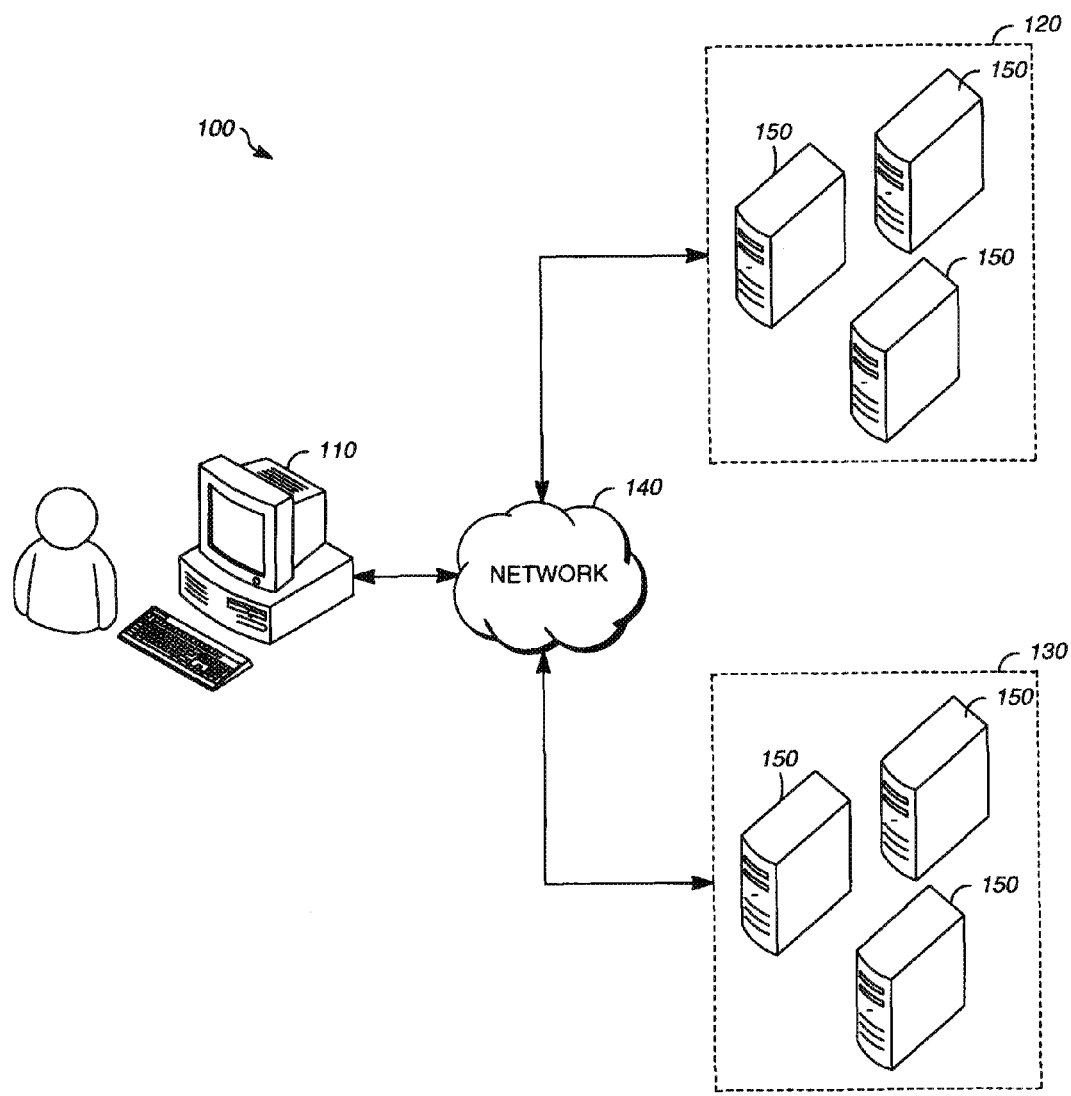
FIG. 1 is a block diagram showing an example of a system for setting DNS records.

FIG. 1 shows an example of a system 100 for setting DNS records. The system 100 can, in some implementations, be automatic or semi-automatic. The system 100 can include a user system 110, an application provider system 120, and a registrar system 130 that are in communication via a network 140. The user system 110 can be any manner of computer or computing device, such as a desktop computer, a laptop computer, a tablet computer, or a smart-phone (a computationally-enabled mobile telephone). The application provider system 120 and the registrar system 130 can each include one or more server computers such as the host computing devices 150. The network 140 can be one or more communications networks of any suitable type in any combination, including wireless networks, wired networks, local area networks, wide area networks, cellular data networks, and the internet.

In the system 100, an application function is implemented by one or more computers. In one example, the application function is implemented by one or more computers that are associated with the user system 110. In another example, the application function is implemented by one or more computers that are associated with the application provider system 120, such as the host computing devices 150. The systems and methods described herein allow a user-specified domain name to be associated with the application function in response to a request to do so from the user, which may be received, for example, in the form of a user input at the user system 110. In examples where the application function is implemented at the user system 110, the application provider system 120 is unnecessary, and the communications described herein can occur solely between the user system 110 and the registrar system 130 via the network 140. In examples where the application function is implemented at the application provider system 120, the request to associate the user-specified domain name can be received at the user system 110 and transmitted to the application provider system 120 via the network 140. The application provider system 120 can then communicate via the network with the user system 110 and the registrar system 130.

Figure 2:
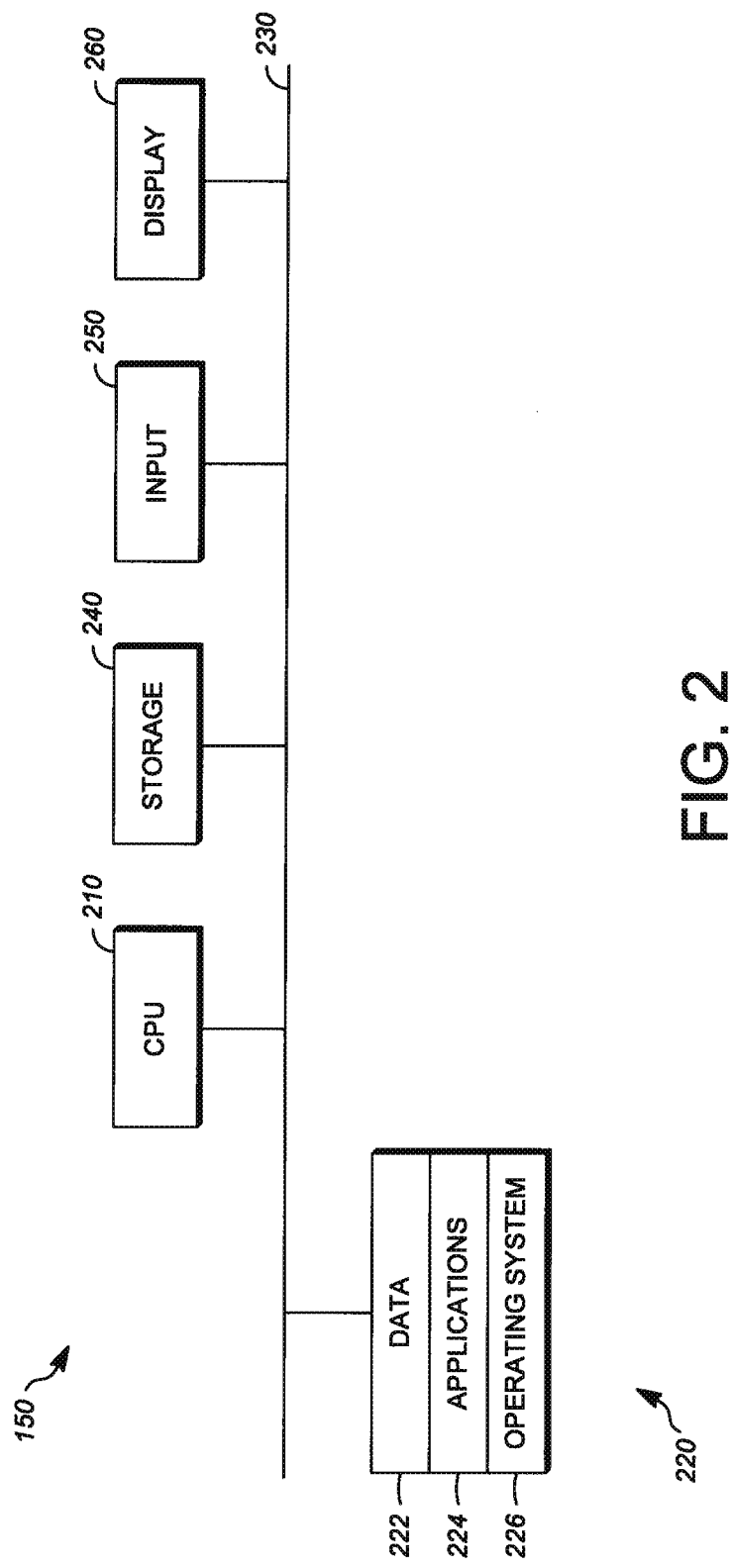
FIG. 2 is a block diagram showing an example of a host computer.

FIG. 2 is a block diagram of an example of a hardware configuration for the host computing device 150 that can be utilized to implement the system for setting DNS records. The host computing devices 150 can each include a CPU 210. The CPU 210 of the host computing devices 150 can be conventional central processing units. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The host computing device 150 can each include memory 220, such as a random access memory device (RAM). Any other suitable type of storage device can be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described herein.

A storage device 240 can be optionally provided in the form of any suitable computer readable medium, such as a hard disc drive, a memory device, a flash drive or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as liquid crystal display (LCD) or a cathode-ray tube (CRT), allows output to be presented to a user, for example, in response to receiving a video signal.

Although FIG. 1 depicts the CPU 210 and the memory 220 of the host computing devices 150 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines performing the operations of the host computing device 150. Although depicted here as a single bus, the bus 230 of each of the host computing devices 150 can be composed of multiple buses. Further, the storage device 140 of each of the host computing devices 150 can be directly coupled to the other components of the respective host computing device 150 or can be accessed via a network and can comprise a single integrated unit such as a memory card or multiple units such as multiple memory cards. The host computing device 150 can thus be implemented in a wide variety of configurations.

FIGS. 3A-3E show examples of configuration screens that can be shown to a user at a display screen of the user system 110 during execution of a process for setting DNS records, as will be described herein. The user can be the owner of a user-specified domain name, or a person acting on behalf of the owner of the user-specified domain name. The process described herein can be performed in response to a request that is made by the user to associate the user-specified domain name with an application function. The application function can be implemented by either or both of the user system 110 and the application provider system 120. In examples where the process is implemented solely by the user system 110, the example configuration screens shown in FIGS. 3A-3E can be caused to be displayed at a display screen of the user system 110 by software that is executed by the user system 110. In examples where the application function is implemented by the application provider system 120, the configuration screens shown in FIGS. 3A-3E can be caused to be displayed at a display screen of the user system 110 by software that is executed at the application provider system 120, and in response to information that is received at the user system 110 from the application provider system 120. The example described herein will be made in respect to the system 100 in which the application function is implemented by the application provider system 120, but it should be understood that this example is equally applicable to an example in which the application function is implemented by the user system 110.

Initially, a request to associate a user-specified domain name with an application function is transmitted from the user system 110 to the application provider system 120. The request can be generated at the user system 110 in response to a user input that is received at an input device that is associated with the user system 110. Alternatively, the request can be generated at the user system 110 automatically such as in response to execution of a software function. The application provider system 120 in response to the request transmits information to the user system 110 that causes the first configuration screen 310 to be displayed at the user system 110. The first configuration screen 310 informs the user that a verification process will be performed to verify that the user is, in fact, the owner of the user-specified domain name, which is identified in the figures as "example.com" or is acting on behalf of the owner of the user-specified domain name. A user input can be received to confirm that the verification process can be performed, such as at a button 312.

Figure 3A:
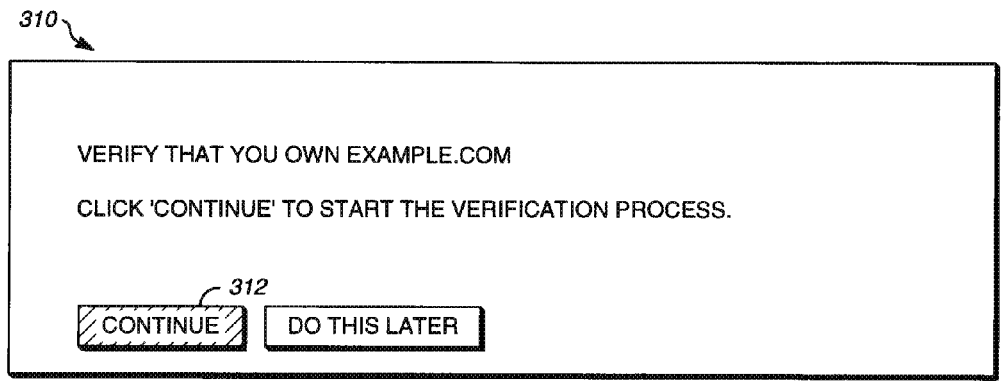
FIGS. 3A-3E are illustrations showing examples of configuration screens that can be used in the system for setting DNS records of FIG. 1.
Figure 3B:
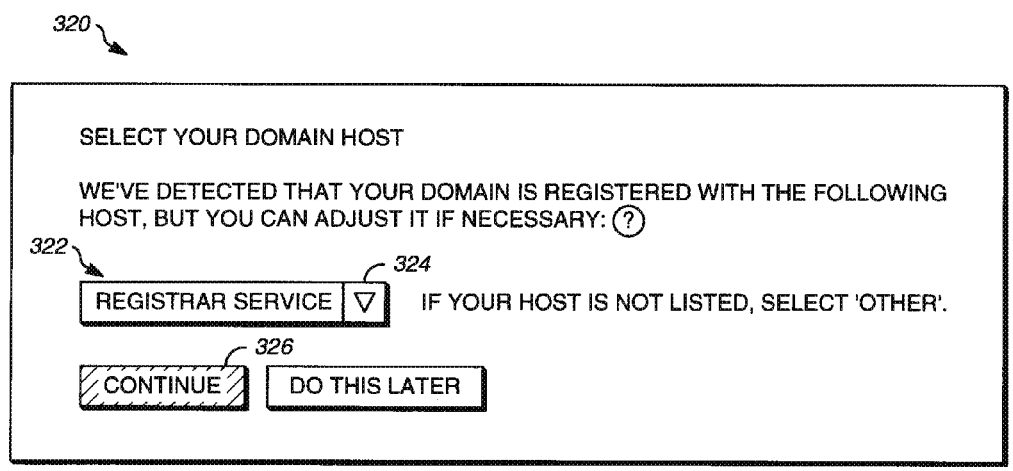

Based on the user-specified domain name, the application provider system 120 can attempt to determine the identity of the domain registrar, such as the registrar system 130 that is responsible for maintaining DNS records for the user-specified domain name. This can be done, for example, by accessing publicly-available records, such as WHOIS records. As shown in FIG. 3B, a second configuration screen 320 can be displayed at the user system 110 based on information that is received from the application provider system 120. The second configuration screen 320 can display the identity 322 of the registrar system 130 as was automatically determined. Alternatively or in addition, a user operable control 324 can be provided to allow the user to specify the identity of the registrar system 130. The user can then confirm that the identity of the registrar system 130 is properly identified using a button 326. Operation of the button 326 transmits information to the application provider system 120 that confirms or indicates the identity of the registrar system 130.

Figure 3C:
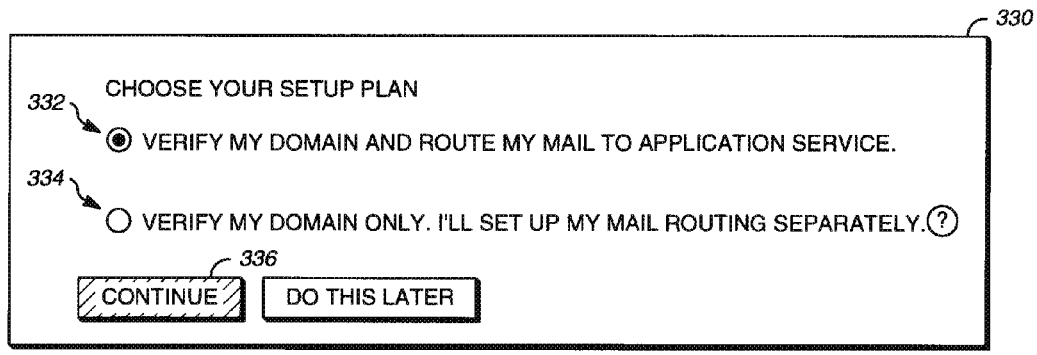

In a third configuration screen 330, as shown in FIG. 3C, the user is asked to indicate whether the user-specified domain name should be associated with the application function. In this example, a first option 332 can be selected by the user to cause both verification of ownership of the user-specified domain name and to cause association of the user-specified domain name with the application function, which, in this example, is an internet-based email client. A second option 334 can be displayed and selected by the user if desired. In this case, the second option 334 allows the user to verify ownership of the domain name without associating the user-specified domain name with the application function. Other options could be displayed, such as allowing association of the user-specified domain name with additional application functions. Once the appropriate selection has been made, the user can confirm its selection using a button 336. Operation of the button 336 can cause transmission of the user's selection to the application provider system 120.

Figure 3D:
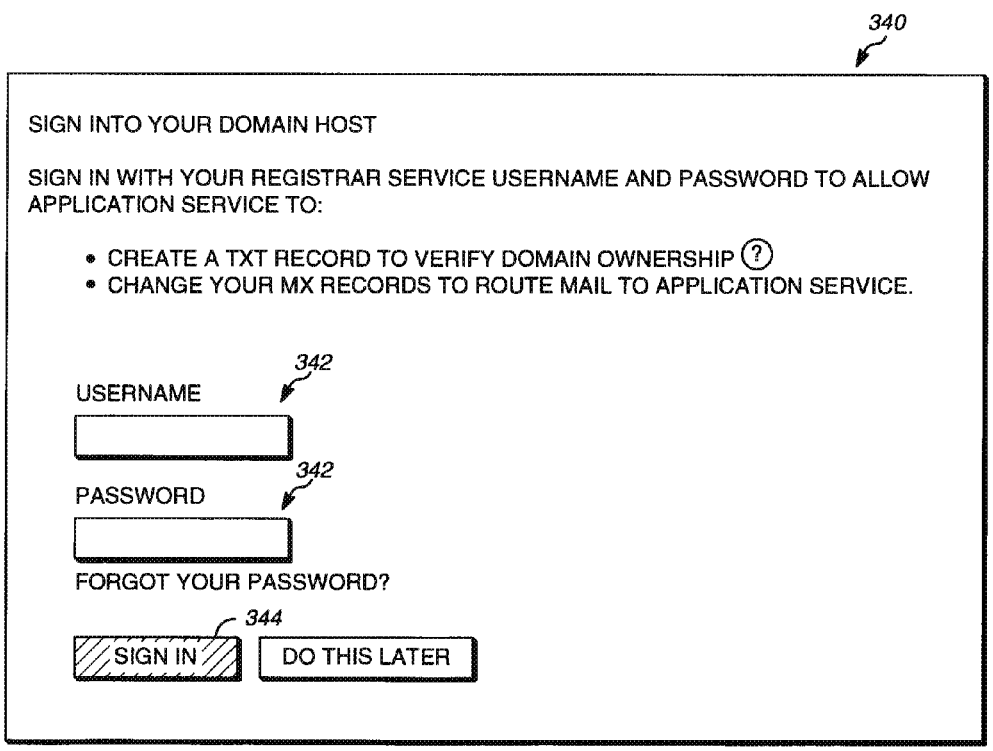
Figure 3E:
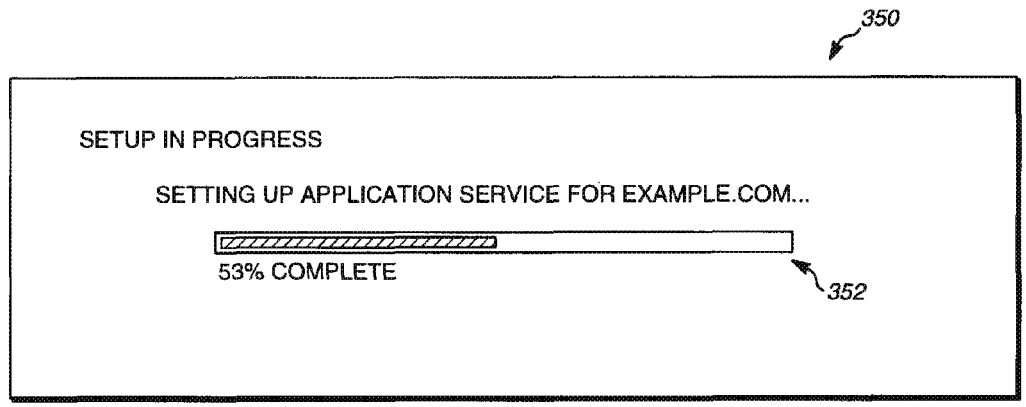

FIG. 3D shows a fourth configuration screen 340, which can be displayed at the user system 110 in response to information that is received from the application provider system 120. The fourth configuration screen 340 includes one or more form fields 342. Using the form fields 342, the user can supply at least one authorization credential to the application provider system 120. In the example shown in FIG. 3D, the at least one authorization credential includes a username and a password that allow access to an account at the registrar system 130 that is associated with the user-specified domain name. The at least one authorization credential can be utilized by the application provider system 120 to communicate with the registrar system 130, access configuration information regarding the user-specified domain name, and set one or more DNS records that are associated with the user-specified domain name at the registrar system 130, as will be explained further herein. After the at least one authorization credential has been supplied by the user in the form fields 342, the at least one authorization credential can be transmitted from the user system 110 to the application provider system 120 using a button 344. Subsequent to submission of the at least one authorization credential at the fourth configuration screen 340, the application provider system 120 can contact the registrar system 130 and set one or more DNS records that are associated with the user-specified domain name. While this process is taking place, a fifth configuration screen 350 can be displayed at the user system 110 based on information that is received from the application provider system 120. The fifth configuration screen 350 can include, for example, a progress bar 352. After the process is completed, confirmation of successful completion of the process can be reported to the user via a further configuration screen (not shown).

Figure 4A:
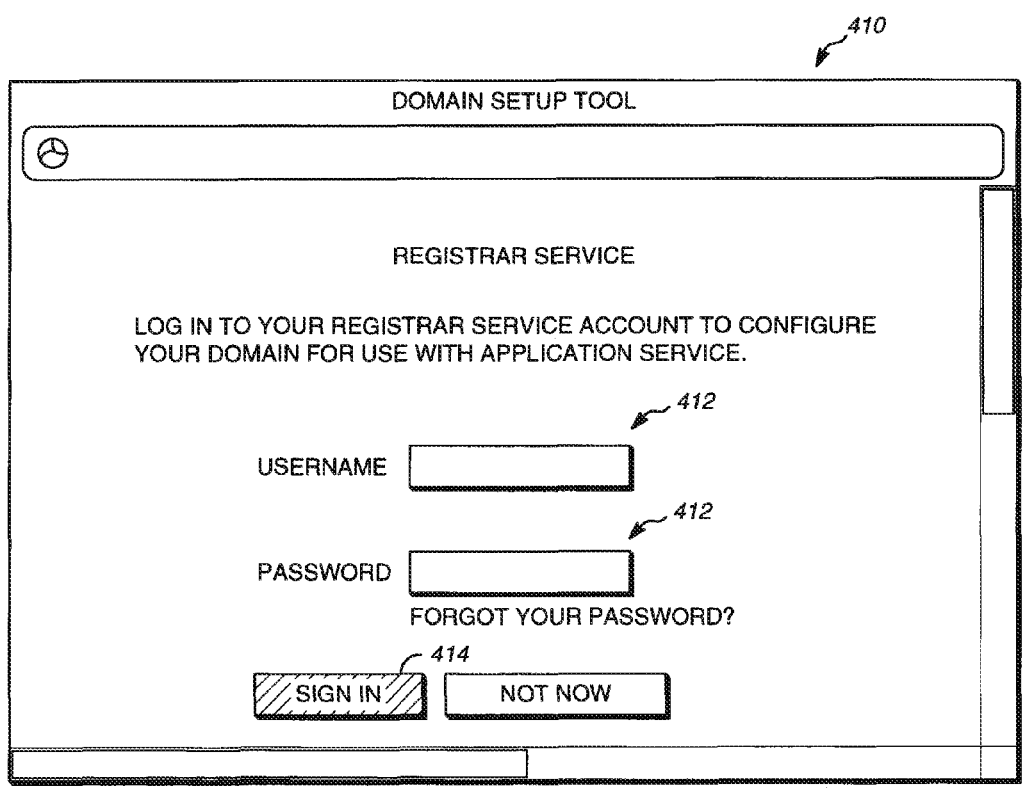
FIGS. 4A-4B are alternative examples of configuration screens that can be used in the system for setting DNS records of FIG. 1.
Figure 4B:
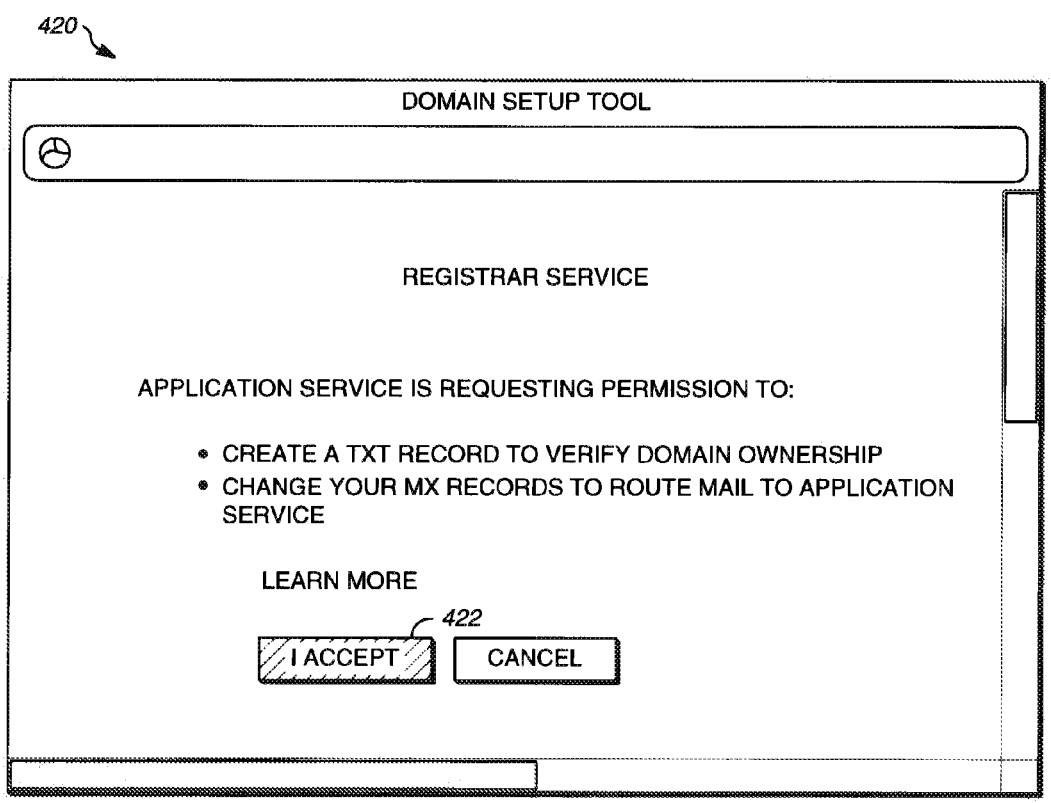

FIGS. 4A and 4B show a first alternative configuration screen 410 and a second alternative configuration screen 420. The first alternative configuration screen 410 and the second alternative configuration screen 420 can be displayed at the user system 110 based on information that is transmitted from the registrar system 130 to the user system 110. These configuration screens can be used to provide at least one authorization credential to the application provider system 120 in lieu of receiving a username and password from the user system 110 at the application provider system 120, as explained on connection with FIG. 3D.

Information for displaying the first alternative configuration screen 410 at the user system 110 can be transmitted by the registrar system 130 in response to a request that is received at the registrar system 130 from the application provider system 120 as part of a token-based authentication system. Using the first alternative configuration screen 410, the user can input at least one authorization credential, such as a username and password, into form fields 412. A button 414 can then be used to cause the username and password, as supplied in the form fields 412, to be transmitted from the user system 110 to the registrar system 130. Upon receiving the username and password from the user system 110, the registrar system can transmit information to the user system 110 that causes the second alternative configuration screen 420 to be displayed at the user system 110. The second alternative configuration screen 420 can inform the user that the application provider system 120 is requesting permission to perform one or more operations at the registrar system 130. The user can grant the requested permissions to the application provider system 120 using a button 422 that is provided as part of the second alternative configuration screen 420. In response to receiving this authorization from the user system 110, the registrar system 130 can issue at least one authorization credential to the application provider system 120, such as an authorization token. The authorization token can be stored at the application provider system 120 and subsequently be used to perform operations at the registrar system 130, such as setting one or more DNS records that are associated with the user-specified domain name.

One example of a token-based authorization scheme that can be utilized in the example shown in FIGS. 4A and 4B is the OAuth protocol, which utilizes tokens that may be referred to herein as Oauth tokens. Other protocols could be used to provide the at least one authorization credential.

Using the at least one authorization credential, the application provider system 120 can communicate with the registrar system 130. As an example, an application programming interface can be implemented at the registrar system 130 in order to permit the application provider system to set DNS records that are associated with the user-specified domain name. In one implementation, the application programming interface of the registrar system 130 supports create, read, update, and delete operations.

FIG. 5A shows an example of a communication 500 from the application provider system 120 to the registrar system 130, in which the application provider system 120 requests data describing the DNS settings that are currently being applied to the user-specified domain name. The communication 510 is directed to a configuration URL that is identified by the application provider system 120 based on the user-specified domain name. The configuration URL includes a configuration host name 512 that is associated with the registrar system 130 and a configuration path name 514 that is associated with the user-specified domain name. The configuration path name 514 may be referred to herein as a path component of the configuration URL. In the communication 510, the configuration host name 512 is "example.org," and the configuration path name 514 is "/api/dnsrecords/example.com." The communication 510 is in the form of an http GET request and also includes the at least one authorization credential as a query string 516, which in this case is in the form of a text-based access token. Upon receiving the communication 510 and determining that the application provider system is authorized to access information regarding the DNS records associated with the user-specified domain name, the registrar system can transmit a response message 520 to the application provider system 120. In this example, the response message 520 is in the form of a text document in JSON format. Other formats can be used including markup languages such as the XML format.

The response message 520 can include a status message 522, which, in this case, indicates that the request to retrieve resource records regarding the user-specified domain name was successful. The response message 520 also includes a list of resource record sets 524. In this example, the list of resource record sets 524 includes two resource record sets 526, each of which includes information regarding the DNS settings that are associated with the user-specified domain name. Each of the resource record sets 526 can include information such as a resource record type 528, one or more resource record values 530, the identity of the user-specified domain name 532, and optionally, any other data associated with the resource records.

As shown in FIG. 6A, the application provider system 120 can modify the DNS settings that are associated with the user-specified domain name by generating a domain record file 610 and transmitting the domain record file 610 to the registrar system 130 using, for example, an http POST request. The domain record file 610 is transmitted to the registrar system 130 using the configuration URL including the configuration host name 512, the configuration path name 514, and optionally, the query string 516. The domain record file 610 can be a text document in a format such as JSON, XML, or any other suitable format.

The domain record file 610 can include information that instructs the registrar system 130 to modify the DNS settings that are associated with the user-specified domain name. As an example, the domain record file 610 can include a delete instruction 612 and information identifying a set of one or more resource records to be deleted, such as a first set of resource records 614. The domain record file 610 can also include, as an example, an add instruction 616 and information identifying one or more resource records to be added to the resource records that are associated with the user-specified domain name, which, in this example, are provided in the form of a second set of resource records 618. The first set of resource records 614 and the second set of resource records 618 can each include information such as an identity of the user-specified domain name 620 a type of resource record 622, one or more resource record values 624, and any other data that is associated with the resource record values 624.

The information contained in the domain record file 610, when processed by the registrar system 130, causes the registrar system 130 to change one or more DNS settings that are associated with the user-specified domain name. For example, the delete instruction 612, when processed by the registrar system 130, causes the registrar system 130 to delete each resource record that is specified by the first set of resource records 614 and the add instructions 616, when processed by the registrar system 130, causes the registrar system 130 to add the resource records from the second set of resource records 618 to the resource records that are associated with the user-specified domain name at the registrar system 130.

After the registrar system 130 processes the domain record file 610, a status message can be transmitted to the application provider system 120 from the registrar system 130, as shown in FIGS. 6B-6C. A first status message 630 (FIG. 6B) indicates that the registrar system 130 successfully processed the changes indicated in the domain record file 610. A second status message 640 (FIG. 6C) indicates that the registrar system 130 failed to successfully process the information in the domain record file 610. The second status message 640 can further indicate the reason for the error. For example, if the application provider system 120 is not properly authenticated with the registrar system 130, the second status message 640 can indicate that the application provider system 120 does not have the privileges necessary to modify the DNS records that are associated with the user-specified domain name.

Figure 7:
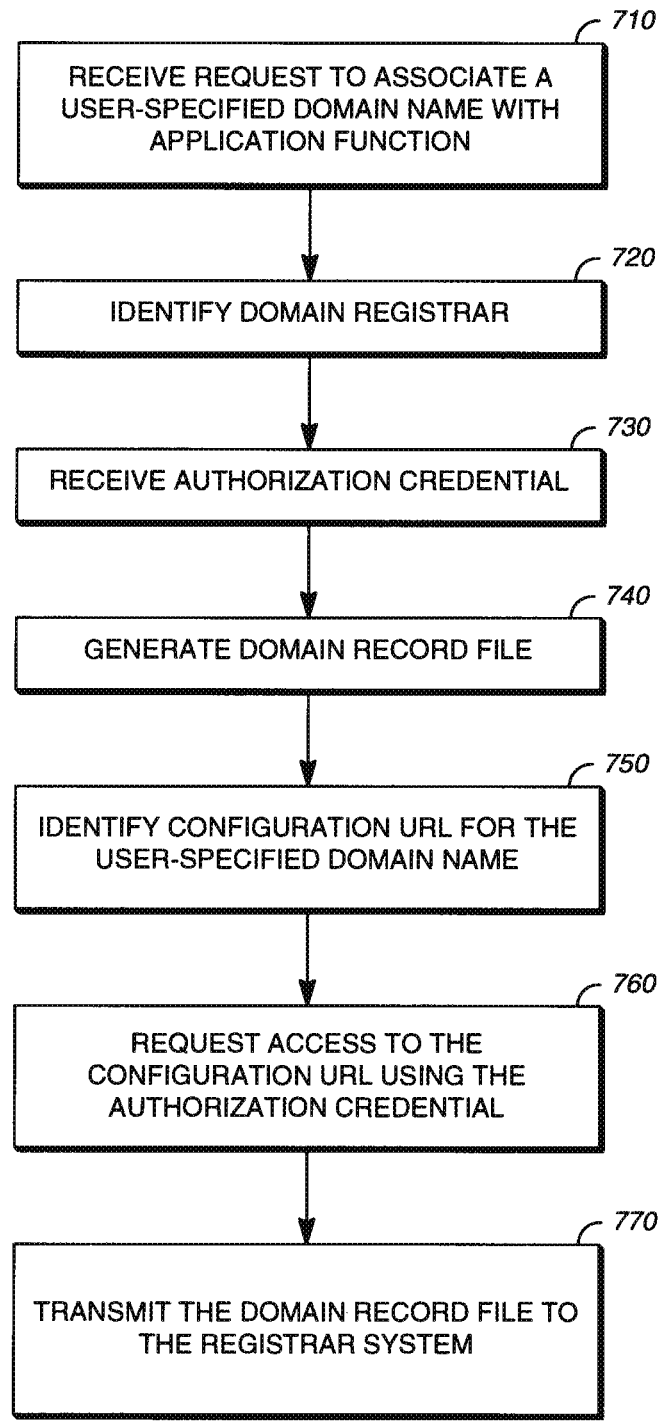
FIG. 7 is a flow chart showing an example of a process for setting DNS records.

FIG. 7 is a flow chart showing an example of a process 700 for setting DNS records.

The operations described in connection with the process 700 can be performed at one or more computers, such as at one of the host computing devices 150. When an operation is performed by one or more computers, it is completed when it is performed by one computer. The operations described in connection with the process 700 can be embodied as a non-transitory computer readable storage medium including program instructions executable by one or more processors that, when executed, cause the one or more processors to perform the operations. For example, the operations described in connection with the process 700 could be stored at the memory 220 of one of the host computing devices 150 and be executable by the CPU 110 of the respective host computing device 150.

In operation 710, a request to associate the user-specified domain name with the application function is received. As an example, a user input can be made at the user system 110, and in response to that user input, the user system 110 can transmit the request to the application provider system 120.

In operation 720, a registrar system is identified based on the user-specified domain name. In one example, the identity of the registrar system can be determined at the application provider system based on the user-specified domain name using records that are accessible to the application provider system 120, such as publicly-available user information.

In operation 730, the authorization credential is received. In one example, the application provider system requests at least one authorization credential in the form of a username and password from the user system 110, and the authorization credential is then received from the user system 110. In another example, the application provider system 120 requests an authorization credential from the registrar system 130 in the form of a token-based authentication credential, which is transmitted from the registrar system 130 to the application provider system 120 after the registrar system 130 receives permission from the user system 110.

In operation 740, a domain record file is generated. The domain record file can include domain record information that, when processed by the registrar system 130, is operable to cause association of the user-specified domain name with the application function. The domain record information can identify at least one resource record corresponding to the user-specified domain name, and at least one resource record value corresponding to the at least one resource record. In some examples, the domain record file is a JavaScript object notation document. In other examples, the domain record file is an extensible markup language document.

In operation 750, a configuration URL for the user-specified domain name is identified. The configuration URL can include a configuration host name that is associated with the registrar system 130. The configuration URL can also include a configuration pathname that corresponds to a record-setting API that is operable to modify one or more domain name records that are associated with the user-specified domain name. In some examples, the user-specified domain name can be included as a component of the configuration pathname.

In operation 760, access to the configuration URL is requested using the authorization credential. As an example, the application provider system 120 can transmit a request regarding the domain record information to the registrar system along with the authorization credential.

In operation 770, the domain record file is transmitted. In one example, the application provider system 120 transmits the domain record file to the registrar system 130. As an example, the domain record file can be transmitted as the body of an http POST request.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

What is claimed is:

1. A method comprising:
receiving, at one or more computers, a request to associate a user-specified domain name with an application function;
identifying, at the one or more computers, a registrar system based on the user-specified domain name;
generating, at the one or more computers, a domain record file including domain record information that, when processed by the registrar system, is operable to cause association of the user-specified domain name with the application function;
identifying, at the one or more computers, a configuration URL based on the user-specified domain name, the configuration URL including a configuration hostname associated with the registrar system and a configuration pathname that is associated with the user-specified domain name and corresponds to a record-setting API at the registrar system that is operable to modify one or more domain name records that are associated with the user-specified domain name; and
transmitting the domain record file from the one or more computers to a location specified by the configuration pathname and a server identified by the configuration hostname at the registrar system using the configuration URL.

2. The method of claim 1, wherein the domain record information identifies at least one resource record corresponding to the user-specified domain name and at least one resource record value corresponding to the at least one resource record.

3. The method of claim 2, wherein the domain record file is a JavaScript Object Notation (JSON) document.

4. The method of claim 2, wherein the domain record file is an Extensible Markup Language (XML) document.

5. The method of claim 2, wherein the configuration pathname includes the user-specified domain name as a path component thereof.

6. The method of claim 5, further comprising:
receiving at least one authorization credential; and
requesting, from the registrar system, access to the configuration URL using the at least one authorization credential.

7. The method of claim 6, wherein the at least one authorization credential is a token that is transmitted from the registrar system in response to a request that is received at the registrar system.

8. The method of claim 7, wherein the token is an OAuth token.

9. The method of claim 6, wherein the at least one authorization credential includes a username and a password that are received at the registrar system.

10. The method of claim 1, wherein the domain record information includes information identifying a first set of one or more resource records, a delete instruction for causing the registrar system to delete each resource record from the first set of one or more resource records, information identifying a second set of one or more resource records, and an add instruction for causing the registrar system to add each resource record from the second set of resource records.

11. A non-transitory storage medium including program instructions executable by one or more processors that, when executed, cause the one or more processors to perform operations, the operations comprising:
receiving, at one or more computers, a request to associate a user-specified domain name with an application function;
identifying, at the one or more computers, a registrar system based on the user-specified domain name;
generating, at the one or more computers, a domain record file including domain record information that, when processed by the registrar system, is operable to cause association of the user-specified domain name with the application function;
identifying, at the one or more computers, a configuration URL based on the user-specified domain name, the configuration URL including a configuration hostname associated with the registrar system and a configuration pathname that is associated with the user-specified domain name and corresponds to a record-setting API at the registrar system that is operable to modify one or more domain name records that are associated with the user-specified domain name; and transmitting the domain record file from the one or more computers to a location specified by the configuration pathname and a server identified by the configuration hostname at the registrar system using the configuration URL.

12. The storage medium of claim 11, wherein the domain record information identifies at least one resource record corresponding to the user-specified domain name and at least one resource record value corresponding to the at least one resource record.

13. The storage medium of claim 12, wherein the domain record file is a JavaScript Object Notation (JSON) document.

14. The storage medium of claim 12, wherein the domain record file is an Extensible Markup Language (XML) document.

15. The storage medium of claim 12, wherein the configuration pathname includes the user-specified domain name as a path component thereof.

16. The storage medium of claim 15, further comprising:
receiving at least one authorization credential; and
requesting, from the registrar system, access to the configuration URL using the at least one authorization credential.

17. The storage medium of claim 16, wherein the at least one authorization credential is a token that is transmitted from the registrar system in response to a request that is received at the registrar system.

18. The storage medium of claim 17, wherein the token is an OAuth token.

19. The storage medium of claim 16, wherein the at least one authorization credential includes a username and a password that are received at the registrar system.

20. The storage medium of claim 11, wherein the domain record information includes information identifying a first set of one or more resource records, a delete instruction for causing the registrar system to delete each resource record from the first set of one or more resource records, information identifying a second set of one or more resource records, and an add instruction for causing the registrar system to add each resource record from the second set of resource records.

21. An apparatus, comprising:
one or more processors; and
one or more memory devices for storing program instructions used by the one or more processors, wherein the program instructions, when executed by the one or more processors, cause the one or more processors to:
receive, at the one or more processors, a request to associate a user-specified domain name with an application function;
identify, at the one or more processors, a registrar system based on the user-specified domain name;
generate, at the one or more processors, a domain record file including domain record information that, when processed by the registrar system, is operable to cause association of the user-specified domain name with the application function;
identify, at the one or more processors, a configuration URL based on the user-specified domain name, the configuration URL including a configuration hostname associated with the registrar system and a configuration pathname that is associated with the user-specified domain name and corresponds to a record-setting API at the registrar system that is operable to modify one or more domain name records that are associated with the user-specified domain name; and
transmit the domain record file from the one or more processors to the location specified by the configuration pathname and the server identified by the configuration hostname at the registrar system using the configuration URL.

22. The apparatus of claim 21, wherein the domain record information identifies at least one resource record corresponding to the user-specified domain name and at least one resource record value corresponding to the at least one resource record, and the domain record file is at least one of a JavaScript Object Notation (JSON) document or an Extensible Markup Language (XML) document.

23. The apparatus of claim 22, wherein the configuration pathname includes the user-specified domain name as a path component thereof.

24. The apparatus of claim 23, wherein the program instructions further cause the one or more processors to:
receive at least one authorization credential, wherein the at least one authorization credential is at least one of a token that is transmitted from the registrar system in response to a request that is received at the registrar system or a username and a password that are received at the registrar system; and
request, from the registrar system, access to the configuration URL using the at least one authorization credential.

25. The apparatus of claim 21, wherein the domain record information includes information identifying a first set of one or more resource records, a delete instruction for causing the registrar system to delete each resource record from the first set of one or more resource records, information identifying a second set of one or more resource records, and an add instruction for causing the registrar system to add each resource record from the second set of resource records.

* * * * *